US012260688B2

(12) United States Patent
Vinge

(10) Patent No.: US 12,260,688 B2
(45) Date of Patent: Mar. 25, 2025

(54) METHOD FOR IDENTIFYING VEHICLE PERFORMANCE

(71) Applicant: VOLVO TRUCK CORPORATION, Gothenburg (SE)

(72) Inventor: Rikard Vinge, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 151 days.

(21) Appl. No.: 17/653,998

(22) Filed: Mar. 8, 2022

(65) Prior Publication Data

US 2022/0292896 A1   Sep. 15, 2022

(30) Foreign Application Priority Data

Mar. 15, 2021   (EP) .................................... 21162637

(51) Int. Cl.
*G07C 5/08*   (2006.01)
*G06F 16/28*   (2019.01)

(52) U.S. Cl.
CPC ......... *G07C 5/0841* (2013.01); *G06F 16/285* (2019.01); *G07C 5/0808* (2013.01)

(58) Field of Classification Search
CPC ........ G06N 20/00; G06N 7/01; G06F 16/285; G06F 18/00; G06F 18/23; G06F 18/2321; G06F 18/23213; G06F 18/24137; G06F 16/20; G06F 16/26; G06F 16/27; G06F 16/30; G07C 5/0808; G07C 5/0841; B60W 50/0205; B60W 2050/021; B60W 2050/0215; B60W 2556/10
See application file for complete search history.

(56) References Cited

U.S. PATENT DOCUMENTS

| | | | |
|---|---|---|---|
| 9,075,701 B2 | 7/2015 | Yun et al. | |
| 11,080,307 B1* | 8/2021 | Holub | G06F 16/285 |
| 2007/0088550 A1 | 4/2007 | Filev et al. | |

(Continued)

FOREIGN PATENT DOCUMENTS

CN   110544373 A   12/2019

OTHER PUBLICATIONS

European Office Action dated Aug. 4, 2023 in corresponding European Patent Application No. 21162637.9, 6 pages.

(Continued)

*Primary Examiner* — Robert W Beausoliel, Jr.
*Assistant Examiner* — Cheryl M Shechtman
(74) *Attorney, Agent, or Firm* — Venable LLP; Jeffri A. Kaminski

(57) ABSTRACT

A method for identifying vehicle performance, including maintaining a database with clustered reference data based on first vehicle data, in which each cluster in the clustered reference data is associated with a cluster significant parameter being a cluster threshold indicative of the association of the corresponding cluster; collecting second vehicle data; identifying the second vehicle data with regards to the clusters of the clustered reference data by means of an associated significant parameter and a cluster threshold, and in response of not being able to classify the second vehicle data into a cluster of the clustered reference data, define the second vehicle data as an outlier; identifying vehicle performance based on the cluster identification and determined outlier of the second vehicle data.

19 Claims, 3 Drawing Sheets

(56) References Cited

U.S. PATENT DOCUMENTS

| | | | |
|---|---|---|---|
| 2011/0035094 A1 | 2/2011 | Van Den Berg et al. | |
| 2012/0245791 A1 | 9/2012 | Yun et al. | |
| 2013/0297141 A1* | 11/2013 | Yun .................. | G06F 17/00 |
| | | | 701/29.1 |
| 2016/0035152 A1* | 2/2016 | Kargupta ............ | G06F 16/955 |
| | | | 701/31.5 |
| 2016/0088006 A1* | 3/2016 | Gupta ................. | H04L 41/149 |
| | | | 706/12 |
| 2018/0276546 A1* | 9/2018 | Joshi ................. | G05B 13/0265 |
| 2019/0188212 A1* | 6/2019 | Miller ................ | H04L 63/145 |
| 2020/0106678 A1 | 4/2020 | Grill et al. | |
| 2020/0363296 A1 | 11/2020 | Westlund et al. | |
| 2020/0370996 A1 | 11/2020 | Liao et al. | |
| 2021/0065187 A1 | 3/2021 | Huang | |
| 2022/0068051 A1* | 3/2022 | Krishnamurthy .. | G05B 23/0283 |

OTHER PUBLICATIONS

European Search Report dated August 3, 2021in corresponding European Patent Application No. 21162637.9, 7 pages.

* cited by examiner

METHOD FOR IDENTIFYING VEHICLE PERFORMANCE

TECHNICAL FIELD

The present invention relates to a method for identifying vehicle performance. The invention further relates to a computer program, and a computer readable medium carrying a computer program, the computer program comprising program code means for performing the method, a processing apparatus for identifying vehicle performance, and to a vehicle.

BACKGROUND

In the transport industry, there is a need for understanding vehicle performance. Vehicle performance is dependent on e.g. engine characteristics, component failures, and usage patterns of vehicles. For example, different usage patterns for the same vehicle model may cause different wear, energy consumption and profitability for the user. Further, depending on the expected usage pattern, different vehicle models can be more or less suitable for the particular use.

For battery electric transport vehicles (BEVs), understanding vehicle performance is of particularly important, and there is a need to understand vehicle usage patterns, wear patterns, early failure indicators, and more.

As described in e.g. US2012245791, there is an increasing interest in the application of electronic control systems in order to develop vehicles into more secure and efficient transportation means. In a vehicle to which such an electronic control system has been applied, data is measured using sensors which are installed in component devices around an engine. Using the measured data, the vehicle is controlled or the problems of the vehicle are diagnosed. Furthermore, it may be possible to send measured data to a remote server via a remote terminal device installed in a vehicle and to then manage vehicle information or remotely make a diagnosis. When information about an individual vehicle is managed as described above, the maintenance of the vehicle can be performed efficiently, and the information can be utilized in various fields related to the operation of the vehicle such as automobile insurance, logistics, traffic and environmental fields. Furthermore, when a problem occurs in a vehicle, the problem can be remotely diagnosed and then countermeasures can be taken, so that the problem with the vehicle can be rapidly dealt with and, therefore, the safety of the vehicle can improved and also the toll of lives can be reduced. However, the technology for predicting future problems with a vehicle by analyzing the internal network data is limited to the diagnosis and prediction of a problem with a specific device of a vehicle. That is, the current technology for predicting a problem with a vehicle is used only to predict a problem with a specific device and the life span of a specific device, such as the life span of a battery or the vehicle, but cannot accurately predict problems with a vehicle attributable to combinations of causes, which result from pluralities of devices. US2012245791 provides a solution by a method for predicting mixed problems with a vehicle. The method predicts changes in transition for the problematic states of a vehicle attributable to combinations of causes using a multi-artificial neural network and a regression analysis method.

Even though the such methods give important information and may predict changes of the vehicles, further improvements in the identification of vehicle performance is needed.

SUMMARY

It is an object of the present invention to at least to some extent improve identification of vehicle performance.

According to at least a first aspect of the present invention, a method for identifying vehicle performance is provided. The method comprises:

maintaining a database with clustered reference data based on first vehicle data, in which each cluster in the clustered reference data is associated with a cluster significant parameter being a cluster threshold indicative of the association of the corresponding cluster;

collecting second vehicle data, determining an associated significant parameter of the second vehicle data corresponding to the cluster significant parameter, comparing the second vehicle data and associated significant parameter with the clustered reference data and cluster thresholds, identifying the second vehicle data with regards to the clusters of the clustered reference data by means of the associated significant parameter and the cluster threshold, and in response of not being able to identify the second vehicle data with regards to a cluster of the clustered reference data, define the second vehicle data as an outlier, identifying vehicle performance based on the cluster identification and determined outlier of the second vehicle data.

Hereby, an efficient data analysis used to identify vehicle performance is provided. The vehicle performance may e.g. be related to vehicle usage patterns, wear patterns, premature failure indicators, quality problems, and more. The vehicle performance may specify when a vehicle will perform in a certain way, and which vehicles that will perform in a certain way. Thus, the identified vehicle performance of the invention enables the identification of e.g. vehicle usage pattern and classification and/or categorisation of the same. Thus, the invention is based on the division of the method in at least two main parts, a first part (i) of providing clustered reference data including data of vehicles in clusters (or identified group based on more than one clusters) based on similar vehicle performance and similar vehicle usage patterns (e.g. similar quality issues); and a second part (ii) of inferring to which cluster or identified group a previously unknown (i.e. not analysed) vehicle belongs. The latter corresponding to the second vehicle data.

By identifying vehicle performance based on the determined cluster identification and determined outlier of the second vehicle data an effective way of classifying and/or categorizing the vehicle performance by comparing with clustered reference data is provided. For example, a second vehicle being operated in a malicious manner, or a second vehicle malfunctioning resulting in an uncontrollable vehicle, can be classified and/or categorized into irrational usage patterns as based on cluster identification and/or determined outliers. Such vehicle may be brought to a stop or may be continuously operated with reduced functionality. According to another example, the vehicle performance of the second vehicle can be classified and/or categorized based on different routes taken by the vehicle, and possibly the effects such different routes have on vehicle components, based on cluster identification and/or determined outliers. The identification of the vehicle performance may also be based on its likelihood of premature failure (or vehicle component failure) by using cluster(s) defining health parameters of the vehicle or vehicle component. Thus, the method of the invention may be advantageous as it e.g. may improve predictive maintenance of the vehicle. Thus, the method of the invention may be used for predicting complications related to the vehicle or vehicle components and/or vehicle usage, such as e.g. predicting mixed complications related to the vehicle or vehicle components and vehicle usage. Consequently, the method may enhance the reliability and the range of the vehicle. Furthermore, by the method, degradation of the vehicle components may be predicted before the vehicle becomes non-functional. That is, the results of the identification of the vehicle performance of the vehicle provides e.g. changes in certain functionalities, and a deviation compared to the clustered reference data which can be detected early. Moreover, the identified vehicle performance may be used as a base-line value, or specific vehicle reference, for subsequent online-tests of the vehicle. The clustered reference data and the second vehicle data may e.g. be stored in a cloud database for tracking and optimization purposes.

By identifying vehicle performance in accordance with the invention, predictions of problems of the vehicle can be achieved, and the problems can be countermeasured before occurring. Thus, the safety of the vehicle, and vehicle performance, can be improved and/or the life of the vehicle components prolonged.

According to at least one example embodiment, an arbitrary number of clusters or identified groups are used to identify vehicle performance.

According to at least one example embodiment, the identified vehicle performance is erroneous performance. In other words, the method may be used for identifying faults in the vehicle or vehicle performance. That is, data analysis is used to predict when vehicles will, and identify which vehicles that will, experience a fault. By identifying such vehicles unplanned stops can be reduced or prevented and, hence, the vehicle uptime improved.

The first vehicle data is to be understood as vehicle data based on first vehicle(s), i.e. vehicle data from one or more first vehicles, wherein first vehicle data is "first" in the sense of being provided prior to the second vehicle data which is subject to the data analysis. Stated differently, by maintaining a database with clustered reference data based on first vehicle data, the first vehicle data has been processed and grouped into clusters, in which each cluster in the clustered reference data is associated with a cluster significant parameter being a cluster threshold indicative of the association of the corresponding cluster. Thus, the first vehicle data has been processed and grouped into different clusters, wherein each cluster is defined by a corresponding cluster significant parameter. By processing the first vehicle data, the data points, or sub-sets of the data, of the first vehicle data can be grouped into different clusters. That is, data points or a sub-set of the first vehicle data that achieves a certain cluster significant parameter (typically by falling within the cluster threshold), is grouped into the corresponding cluster. The cluster defines vehicle performance, or a sub-category of vehicle performance. Moreover, a combination of clusters may define vehicle performance, or a sub-category of vehicle performance.

The cluster threshold may be a numeral threshold, e.g. a specific value, or the threshold may be a threshold range, defining association of a corresponding cluster if the analysed data lies within the threshold range.

The collected second vehicle data is to be understood as vehicle data based on second vehicle(s), i.e. vehicle data from one or more second vehicles, wherein second vehicle data is "second" in the sense of being analysed in relation to the first vehicle data being provided as the clustered reference data. According to at least one example embodiment, the second vehicle(s) is/are different to the first vehicle(s). The second vehicle data may be collected by various means, such as e.g. by sensors, by a driving record or driving log, by written and spoken language, by surveys and/or by geographic position (e.g. GPS).

According to at least one example embodiment, the associated significant parameter of the second vehicle data corresponds to the cluster significant parameter by that the definition of the associated significant parameter is the same as the definition of the cluster significant parameter. For example, the associated and cluster significant parameters are defined as a certain deviation Dev away from a mean M of a distribution D, the associated and cluster significant parameters being zero if Dev is at the mean of D, and grows as Dev moves away from the mean M along each principal component axis. Thus, both the associated and cluster significant parameters may be defined by a certain distance from the mean of a distribution in terms of a distance metric, e.g. with regards to the Euclidian or Mahalanobis distance. Stated differently, the associated and cluster significant parameters may define the probability of belonging to a certain distribution, wherein the cluster significant parameter defines the probability limit of belonging to a certain distribution, and the associated significant parameter determines whether or not the second vehicle data belongs to such distribution.

According to at least one example embodiment, the second vehicle data comprises several sub-sets of second vehicle data, wherein each sub-set is defined by a corresponding associated significant parameter. The second vehicle data can typically be seen as sub-sets of vehicle data subsequent to identifying the second vehicle data with regards to the clusters of the clustered reference data, as each sub-set is corresponding to a cluster identification or cluster-belonging. According to at least one example embodiment, the second vehicle data is as a whole defined by an (one) associated significant parameter. The second vehicle data may typically belong to more than one identified cluster. Thus, vehicle performance may be identified based on the combination of cluster identification of the second vehicle data (i.e. the cluster identification of more than one cluster) and outlier(s).

According to at least one example embodiment, the step of identifying vehicle performance is based on the combination of cluster identification and determined outlier of the second vehicle data.

According to at least one example embodiment, the second vehicle data belongs to more than one cluster.

According to at least one example embodiment, comparing the second vehicle data and associated significant parameter with the clustered reference data and cluster thresholds comprises:

comparing the associated significant parameter with each cluster threshold of the clustered reference data to provide compared vehicle data, and identifying the second vehicle data with regards to the clusters of the clustered reference data comprises:

determining whether or not the compared vehicle data achieves a pre-set criteria, and determining that the second vehicle data belongs to an identified cluster in response of determining that the compared vehicle data achieves the pre-set criteria, and determining that the second vehicle data is an outlier in response of determining that the compared vehicle data does not achieve the pre-set criteria, Thus, the vehicle performance may be identified based on the determined cluster identification and determined outlier of the second vehicle data.

By comparing the second vehicle data, and in particular any determined associated significant parameter of the second vehicle data, with each cluster threshold of the clustered reference data, the second vehicle data can be compared and related to the clustered reference data in the form of compared vehicle data. By determining whether or not the compared vehicle data achieves a pre-set criteria, the second vehicle data can be classified and/or categorised based on the clusters of the clustered reference data. The step of determining whether or not the compared vehicle data achieves a pre-set criteria may be combined with the step of comparing the associated significant parameter of the second vehicle data with each cluster threshold of the clustered reference data. Thus, it should be noted that the compared vehicle data need not to, but may according to one example embodiment, constitute a separate (and storable) data set, but may be included in a general step of comparing and classifying and/or categorising the second vehicle data with the clustered reference data based on the pre-set criteria.

The pre-set criteria may simply be based on a "larger than" and/or a "smaller than", and/or "within" and/or "outside of". For example, if the clustered threshold is a numerical range, the pre-set criteria may be set to determine whether or not the second vehicle data and associated significant parameter is within such numerical range. The pre-set criteria is also linked with a condition, such as a result or outcome, in order to determine that the second vehicle data belongs to an identified cluster in response of determining that the compared vehicle data achieves the pre-set criteria, and to determine that the second vehicle data is an outlier in response of determining that the compared vehicle data does not achieve the pre-set criteria. Thus, if the second vehicle data cannot be associated to any cluster within the clustered reference data, it is defined as an outlier. The vehicle performance of the second vehicle(s) can then be identified based on the determined cluster identification and determined outlier of the second vehicle data.

By including the outliers in the identification of the vehicle performance, an improved data analysis method is provided. For example, a broader spectrum of vehicle performance, such as more scenarios or states or occurrences or frequency of the vehicle performance, can be identified. Moreover, by including outliers as one of the parameters decisive for the classification and/or categorisation of the second vehicle data, vehicle performance which otherwise would not be distinguished due to exclusion of the outliers from the data analysis, may be detected and classified.

According to at least one example embodiment, collecting second vehicle data comprises pre-processing the second vehicle data in a corresponding manner as the first vehicle data and clustered reference data. That is, the second vehicle data is pre-processed to make it comparable with the clustered reference data. According to one example embodiment, the first and second vehicle data is subject to corresponding pre-processing. Thus, associated significant parameter and the clustered significant parameter will be corresponding.

According to at least one example embodiment, collecting second vehicle data comprises pre-processing the second vehicle data by aggregating the second vehicle data over a time period to provide aggregated second vehicle data, wherein the associated significant parameter is determined based on the aggregated second vehicle data.

Hereby, an efficient way of pre-processing the second vehicle data is provided. Such type of aggregated data is more easily related to an associated significant parameter. As stated before, the first vehicle data is preferably pre-processed in a corresponding manner.

According to at least one example embodiment, the cluster significant parameter and the associated significant parameter for the second vehicle data are based on the Mahalanobis distance.

With reference to the above description of the associated and cluster significant parameters described as a deviation Dev in relation to a mean M of a distribution D, the Mahalanobis distance is a measure of the distance between a point P and a distribution D. It may be described as a multi-dimensional generalization of the idea of measuring how many standard deviations away P is from the mean M of D. The Mahalanobis distance is unitless and scale-invariant, and takes into account the correlations of the data set. Moreover, the Mahalanobis distance provides an easy-to-use regression metric to determine cluster-belonging and thus predict vehicle performance, e.g. whether a vehicle will end up with a quality issue in the future.

According to at least one example embodiment, any outlier identified does not belong to an identified cluster.

Thus, an outlier is defined as being outside of each cluster in the clustered reference data. Hereby, the data points of the second vehicle data being deemed as outliers may be broadly distributed over the data window of the second vehicle data. According to at least one example embodiment, the outliers are gathered into a separate cluster links by the relative distance between each outlier and the various clusters. Thus, certain outliers may be linked to certain clusters, without being defined as belonging to such cluster. Hereby, the outliers and their linked clusters can be treated differently in the data analysis.

According to at least one example embodiment, the clustered reference data based on first vehicle data is determined by:
  collecting first vehicle data and pre-processing the first vehicle data by aggregating the first vehicle data over a time period to provide aggregated first vehicle data;
  processing the aggregated first vehicle data by clustering the aggregated first vehicle data using a clustering technique to provide clustered reference data based on first vehicle data.

As mentioned previously for the second vehicle data, such type of aggregated data is more easily related to a clustered significant parameter. The first vehicle data may be collected by various means, such as e.g. by sensors, by a driving record or driving log, by written and spoken language, by surveys and/or by geographic position (e.g. GPS).

According to at least one example embodiment, the clustering technique is a machine learning algorithm.

According to at least one example embodiment, the clustering technique used for clustering the aggregated first vehicle data is based on a machine learning algorithm, such as e.g. OPTICS. The clustering technique OPTICS is advantageous due to its ability to identify outliers and its simplicity of selecting cluster boundaries through so called reachability plots of data. The clustering technique OPTICS may be defined as a density-based clustering method that uses two hyperparameters, E and MinPts representing the maximum distance from a point to consider another point as close, and the minimum number of points that are required to create a cluster, respectively. Moreover, the clustering technique of OPTICS furthermore considers clusters of varying density, which is advantageous for analysis of vehicle data as assumptions on similar densities for all clusters is not true. The clusters may be labelled through analysis of constituting samples, e.g. based on GPS traces, time information and/or vehicle usage related to different vehicle routes and compared to known information about the vehicle and known vehicle routes.

According to at least one example embodiment, the clustered reference data comprises outliers of the first vehicle data. The outliers of the first vehicle data may be used in the data analysis of the second vehicle data, or may simply be disregarded.

According to at least one example embodiment, for the first vehicle data and/or the second vehicle data, the aggregation of the data is based on a summation or averaging of the data.

According to at least one example embodiment, the method further comprises:
identifying cluster within the clustered reference data by comparing the clustered reference data with known characteristics to provide a set of identified clusters within the clustered reference data;
generating a predictive model for the identified clusters and for each identified cluster determine a cluster significant parameter being a cluster threshold indicative of the association of the corresponding cluster.

Hereby, an efficient way of comparing the second vehicle data with the first vehicle data, or reference data, is provided.

Thus, by clustering the first vehicle date e.g. using machine learning, as OPTICS, and comparing with known characteristics or known information, clustered reference data based on first vehicle data is provided with well-defined and identified clusters related to vehicle performance.

In more detail, and according to at least one embodiment, the population distribution of each identified cluster is modelled using e.g. a multivariate normal distribution to fit the data sample of each cluster by means of the sample mean and sample covariance and the cluster-belonging may be inferred using multi-class Gaussian Discriminant Analysis. Thus, cluster-belonging may be inferred through a likelihood ratio test, under the assumption of normal population distributions. That is, for the second vehicle data (or aggregated second vehicle data) being generalised by sample x, the likelihood of x belonging to a cluster $c \in \{1, \ldots, C\}$ is calculated and the sample x is classified to belong to the cluster of maximum likelihood, i.e. sample x is classified to belong to cluster c such that $L_c(x) = \max \{L_1(x), \ldots, L_c(x)\}$. Here, $L_c(x)$ is the likelihood function of a sample x for a multivariate normal distribution defined as:

$$L_c(x) = \left(\frac{1}{\sqrt{(2\pi)^p |\hat{\Sigma}_c|}}\right) \exp\left(-\frac{1}{2}(x - \hat{\mu}_c)^T \hat{\Sigma}_c^{-1} (x - \hat{\mu}_c)\right)$$

where $\hat{\mu}_c$ is the sample mean and $\hat{\Sigma}_c$ the sample covariance matrix of cluster c, and p the number of features. To avoid numerical instability in the covariance matrices, features may be are standardized to zero mean and unit variance prior to modelling the sample mean and covariance, resulting in zero sample mean and covariance matrices with ones along the diagonal.

Moreover, and according to at least one example embodiment, outliers are defined as not belonging to any cluster. The outliers may be determined by utilizing the Hotelling's T-squared test and/or by imposing a limit on cluster threshold, e.g. the Mahalanobis distance:

$$M(x) = (x - \hat{\mu})^T \hat{\Sigma}^{-1} (x - \hat{\mu})$$

Hereby, an outlier is defined as not to belong to the distribution with a statistical significance of α if:

$$M(x) > \frac{p(N-1)}{N-p} F(\alpha, p, N-p),$$

where p is the number of features and $F(\alpha, p, N-p)$ is the value of the F-distribution with parameters p and N−p at significance α. The significance level α is typically between 0.01-0.1, such as e.g. 0.01, 0.05, or 0.1 for a confidence level of 99%, 95% and 90%, respectively. The significance level α of 0.01 has been shown to be efficient. The threshold may be interpreted as if the significant parameter exceed the cluster threshold, it has a lower probability than α to belong to the distribution.

That the multivariate normal distribution is applicable for the present invention is based on the Central Limit Theorem (CLT) and the Neyman-Pearson lemma (NPL). CLT states that independently and identically distributed random variables that each are calculated from the sum of an underlying signal, or combination of signals, are normally distributed. For example, the first vehicle data may be assumed to be collected by first vehicles that operate similarly each period (or time period). For example, a refuse truck may be operated by a number of different routes, but that nonetheless are similar, and a long haul truck may be operated between different locations, but the way the vehicle is operated is similar. On a short time scale, some measurements (or vehicle usage signals) forming the basis of the first vehicle data are continuous or cannot otherwise be assumed to be independent. For example speed or gross weight are highly correlated to the corresponding value a short time after a first measurement. However, two measurements taken sufficiently far apart in time may be considered as independent. For a longer time scale and over longer periods of time, e.g. hours, days, or months, the measurements may be considered as mixing random processes which satisfies CLT under weak dependence. Thus, each period may be considered independent from the other as e.g. the route of a refuse tuck a specific day is not dependent on the route the previous day. Thus, the first vehicles are operated independently with respect to the period, and their vehicle performance are equally distributed. Similarly, within subgroups of the first vehicle data, e.g. with vehicle performance without a fault, the data is independent and identically distributed, and for subgroups of first vehicle data with a known fault (e.g. quality issues) are slightly different in their distribution compared to sub-groups not associated with such faults. NPL states that for a known distribution, the likelihood-ratio test is an appropriate statistical tests.

According to at least one example embodiment, the predictive model for the identified clusters is based on the fitting of a multivariate Gaussian probability distribution to each identified cluster.

Thus, a well-defined and suitable multivariate normal distribution may be used.

According to at least one example embodiment, the second vehicle data comprises vehicle behaviour data that is indicative of vehicle behaviour and/or vehicle usage.

Vehicle usage may e.g. be defined by how the vehicle is affected by an external source, such as e.g. a driver of the vehicle, by the typical routes of the vehicle, load and unload patterns, speed, etc. Vehicle behavior may e.g. be defined by how the vehicle behave internally, e.g. how a certain component affects another component (e.g. how the aerodynamic shaped of the vehicle affect the air resistance which in turn affect the energy consumption). Thus, second vehicle data related to e.g. how the vehicle is operated may be analysed. Such vehicle correlation may be coupled to how the driver operates the vehicle. Hereby, irrational driving patterns as based on cluster identification and/or determined outliers can be achieved as previously discussed. Correspondingly, the first vehicle data may comprises vehicle behaviour data that is indicative of vehicle behaviour and/or vehicle usage.

According to at least one example embodiment, the second vehicle data comprises non-sensor based data.

Thus, at least a portion of the second vehicle data is collected from something different than a sensor. Hereby, more, and other types of, vehicle performance may be included in the data analysis. For example, non-sensor based data may be GPS positional data, or service reports of the vehicle.

According to at least one example embodiment, the second vehicle data is collected from a data collection device in the vehicle, such as a data log.

According to a second aspect of the present invention, a computer program comprising program code means for performing the method of the first aspect of the invention, when the program is run on a computer, is provided.

According to a third aspect of the present invention, a computer readable medium carrying a computer program comprising program code means for performing the method of the first aspect of the invention, when the program product is run on a computer, is provided.

Effects and features of the second and third aspects of the invention are largely analogous to those described above in connection with the first aspect of the invention. Embodiments mentioned in relation to the first aspect of the invention are largely compatible with the second and third aspects of the invention.

According to a fourth aspect of the present invention, a processing apparatus for identifying vehicle performance is provided. The processing apparatus is configured to:
maintain a database with clustered reference data based on first vehicle data, in which each cluster in the clustered reference data is associated with a cluster significant parameter being a cluster threshold indicative of the association of the corresponding cluster;
collect second vehicle data,
determine an associated significant parameter of the second vehicle data corresponding to the cluster significant parameter,
compare the second vehicle data and associated significant parameter with the clustered reference data and cluster thresholds,
identify the second vehicle data with regards to the clusters of the clustered reference data by means of the associated significant parameter and the cluster threshold, and in response of not being able to identify the second vehicle data with regards to a cluster of the clustered reference data, define the second vehicle data as an outlier,
identify vehicle performance based on the cluster identification and determined outlier of the second vehicle data.

According to a fifth aspect of the present invention, a vehicle comprising a processing apparatus according to the fourth aspect of the invention is provided.

Effects and features of the fourth and fifth aspects of the invention are largely analogous to those described above in connection with the first aspect of the invention. Embodiments mentioned in relation to the first aspect of the invention are largely compatible with the fourth and fifth aspects of the invention.

The order of the method steps described in the present disclosure is not constrained to that described in the first aspect of the invention. One or several of the steps could switch places, or occur in a different order without departing from the scope of the invention. However, according to at least one example embodiment, the method steps are performed in the consecutive order described in the first aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
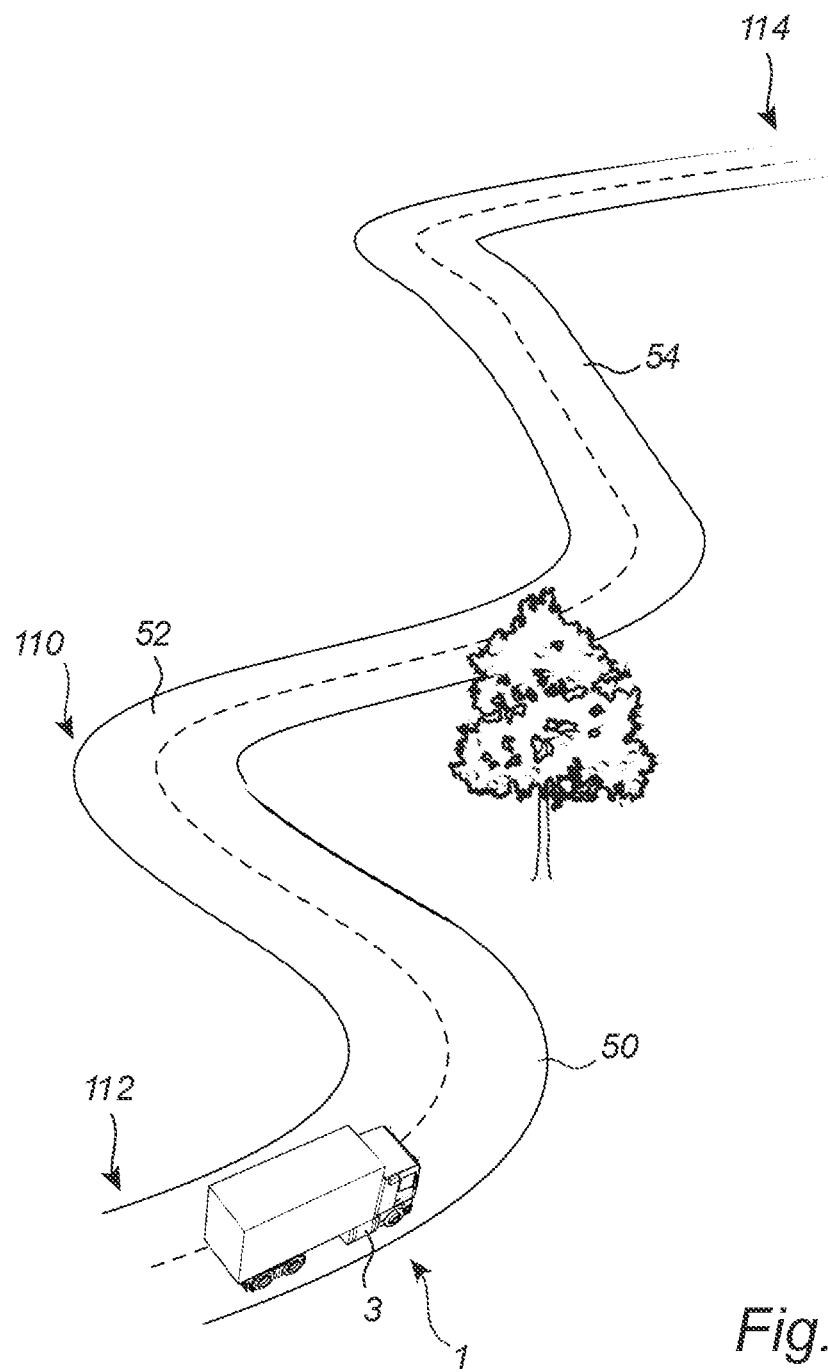
FIG. 1 is a perspective schematic view of a vehicle operated along a road in accordance with an example embodiment of the invention.

With reference to FIG. 1, a vehicle 1, here embodied as a heavy duty truck 1, is disclosed for which a method of a kind disclosed in the present invention is advantageous. However, the method may as well be implemented for other types of vehicles, such as busses, light-weight trucks, passenger cars, marine applications etc. The vehicle 1 may be an electric vehicle, such as a full electric vehicle or a hybrid, comprising at least one electric machine, and an energy storage system comprising energy storage or energy transformation devices, typically batteries or fuel cells, configured to power the electric machine. Alternatively, or additionally, the vehicle comprises an engine, such as an internal combustion engine. The vehicle 1 typically further comprises other parts of the powertrain such as transmission, drive shafts and wheels (not shown in detail in FIG. 1). As seen in FIG. 1, the vehicle may comprise a controlling apparatus 3, e.g. being comprised in an ECU of the vehicle 1.

In FIG. 1, the vehicle 1 is travelling along a road 50 along a route 110 from a first location 112 to a second location 114. Thus, the road 50 with any route events such as road curves 52, hill portions 54 etc. from the first location 112 to the second location 114 is an example of a route 110 along which the vehicle 1 is operated. The vehicle operation is adapted based on the route 110. For example, when approaching the road curve 52 the vehicle 1 may be operated to slow down in order to safely manage the road curve and when approaching the hill portion 54, the vehicle 1 may be accelerated in order to maintain a sufficient speed along the hill portion 54 and/or downshifting for increased engine torque. Moreover, the vehicle operation may be adapted based on the road condition, e.g. wet or snowy conditions. The vehicle operation along the route 110 with considerations taken to the route events and road conditions, and how the driver choses to operate the vehicle 1 by vehicle usage along the route 110 is an example of a vehicle performance. Any vehicle component failure, or reduced performance of the engine due to degraded or failed engine components, may also affect the vehicle operation along the route 110 and may thus be included into the vehicle performance.

A method for identifying vehicle performance, e.g. for the vehicle 1 in FIG. 1, will now be described in detail with reference to the flow chart of FIG. 2 and the graph of FIG. 3. FIG. 3 is showing vehicle data plotted in a graph in which the x- and y-axis are defined by separate features f. The features may e.g. be temperature and State of Charge (e.g. for electrical vehicles), or torque and engine speed (e.g. for vehicles with an internal combustion engine). Other examples of features are speed, ambient temperature, emission level, currents, voltages, acceleration, etc.

In a step S10, e.g. being a first step S10, a database with clustered reference data based on first vehicle data is provided or maintained. The first vehicle data may e.g. be collected by a plurality of first vehicles being operated along a route, similarly to that of route 110 of vehicle 1 of FIG. 1. The clustered reference data comprises clusters in which each cluster is associated with a cluster significant parameter being a cluster threshold indicative of the association of the corresponding cluster. This is exemplified in FIG. 3 in which a first cluster significant parameter being a first cluster threshold 201, and a second cluster significant parameter being a second cluster threshold 202 are shown.

The step S10 may be performed by the following optional sub-steps:

In a first sub-step S12, the first vehicle data is collected and pre-processed by aggregating the first vehicle data over a time period to provide aggregated first vehicle data.

In a second sub-step S14, the aggregated first vehicle data is processed by clustering the aggregated first vehicle data using a clustering technique to provide clustered reference data based on first vehicle data.

As previously described the clustering technique may be a machine learning algorithm.

In a third sub-step S16, clusters within the clustered reference data are identified by comparing the clustered reference data with known characteristics to provide a set of identified clusters within the clustered reference data.

In a fourth sub-step S18, a predictive model for the identified clusters are generated and for each identified cluster a cluster significant parameter is determined. The cluster significant parameter is a cluster threshold indicative of the association of the corresponding cluster. Thus, all data points deemed to fall within a specific cluster will form a cluster defined by the cluster significant parameter. According to one example embodiment, the predictive model for the identified clusters is based on the fitting of a multivariate Gaussian probability distribution to each identified cluster. Thus, in the example of FIG. 3, it is assumed that such sub-steps have been carried out, and only the resulting first and second cluster thresholds 201, 202 are shown.

In a step S20, being e.g. a second step S20, second vehicle data is collected. The second vehicle data is collected from at least one second vehicle, being different to the first vehicle(s) in the sense that the vehicle data from the first vehicle(s) (i.e. the first vehicle data) is used to define the reference data, or clustered reference data, while the vehicle data from the second vehicle(s) (i.e. the second vehicle data) is compared with the reference data. The collection of second vehicle may be carried out by sensors and measurement sensor data, and non-sensor based data as previously described. The second vehicle data may e.g. comprise vehicle behaviour data that is indicative of vehicle behaviour and/or vehicle usage.

The second step S20 may be performed by the following optional sub-step:

In a fifth sub-step S22, the second vehicle data is pre-processed by aggregating the second vehicle data over a time period to provide aggregated second vehicle data, wherein the associated significant parameter is determined based on the aggregated second vehicle data. Such aggregated second vehicle data are shown as the data points, or data samples, in FIG. 3.

In a step S30, being e.g. a third step S30, an associated significant parameter of the second vehicle data corresponding to the cluster significant parameter is determined. Thus, the significant parameter of the second vehicle data (i.e. the associated significant parameter) corresponds to the significant parameter of the clusters (i.e. the cluster significant parameter). In other words, the associated significant parameter of the second vehicle data is comparable, or compatible, to the cluster significant parameter.

In a step S40, being e.g. a fourth step S40, the second vehicle data and associated significant parameter are compared with the clustered reference data and cluster thresholds.

The fourth step S40 may be performed by the following optional sub-step:

In a sixth sub-step S42, the associated significant parameter is compared with each cluster threshold of the clustered reference data to provide compared vehicle data. The compared vehicle data thus comprises a compliable comparison between the second vehicle data and the clustered reference data.

In a step S50, being e.g. a fifth step S50, the second vehicle data is identified with regards to the clusters of the clustered reference data and by means of the associated significant parameter and the cluster threshold, and in response of not being able to identify the second vehicle data into a cluster of the clustered reference data, define the second vehicle data as an outlier, The fifth step S50 may be performed by the following optional sub-step:

In a seventh sub-step S52, it is determined whether or not the compared vehicle data from sub-step S42 achieves a pre-set criteria, and it is determined that the second vehicle data belong to an identified cluster in response of determining that the compared vehicle data achieves the pre-set criteria, and it is determined that the second vehicle data is an outlier in response of determining that the compared vehicle data does not achieve the pre-set criteria.

Thus, with reference to the example of FIG. 3, the second vehicle data, or preferably the aggregated second vehicle data, is classified into two different clusters, the first cluster 210 and the second cluster 220. That is, the second vehicle data comprises at least two cluster identifications, a cluster identification to the first cluster 210 and a cluster identification to the second cluster 220, based on the first and second cluster thresholds 201, 202, respectively. Thus, the second vehicle data is divided into sub-groups, wherein a first subgroup makes up the data points of the second vehicle data in the first cluster 210 and are thus defined by an associated significant parameter 210A falling within the first cluster threshold 201, and wherein a second subgroup makes up the data points of the second vehicle data in the second cluster 220 and are thus defined by an associated significant parameter 220A falling within the second cluster threshold 202. Any data points of the second vehicle data not belonging to an identified cluster, i.e. here being included into one of the first and second clusters 210, 220, is defined as an outlier. Thus, such data points are not included into any of the clusters as the associated significant parameter of such cluster which would incorporate these data points would not fall within the corresponding cluster thresholds.

In a step S60, being e.g. a sixth step, the vehicle performance is identified based on the cluster identification and determined outlier of the second vehicle data. That is, as the clusters of the clustered reference data corresponds to known vehicle performance, or known sub-categories of vehicle performance, the second vehicle data can be identified in relation to such vehicle performance. Moreover, the outliers may correspond to known vehicle performance, or known sub-categories of vehicle performance, or may simply correspond to a vehicle performance not defined by the clusters, and hence be included in the identification of the vehicle performance for improved data analysis.

As previously described, the cluster significant parameter and the associated significant parameter for the second vehicle data may be based on the Mahalanobis distance.

It should be noted that even though FIG. 3 shows the data points of the second vehicle data (and only the cluster thresholds 201, 202 being a result of the first vehicle data or clustered reference data), the same or similar data points as those shown in FIG. 3 could represent the first vehicle data and the clusters defined by the cluster significant parameters resulting in the first and second cluster thresholds 201, 202.

According to at least one example embodiment, the data points of the FIG. 3 represent the average battery state of charge (i.e. the feature on the X-axis) as a function of average battery cell temperature (i.e. the feature on the Y-axis). The first cluster 210 may represent second vehicles for which the battery is drained of energy faster (e.g. they are hotter for a lower state of charge) than for second vehicles of the second cluster 220. Such higher energy drainage may indicate a relatively lower state of capacity, or increased internal resistance in the battery. The outliers may represent second vehicles operated in a manner not applicable for the current battery comparison, or second vehicles with otherwise abnormal battery behavior.

Figure 2:
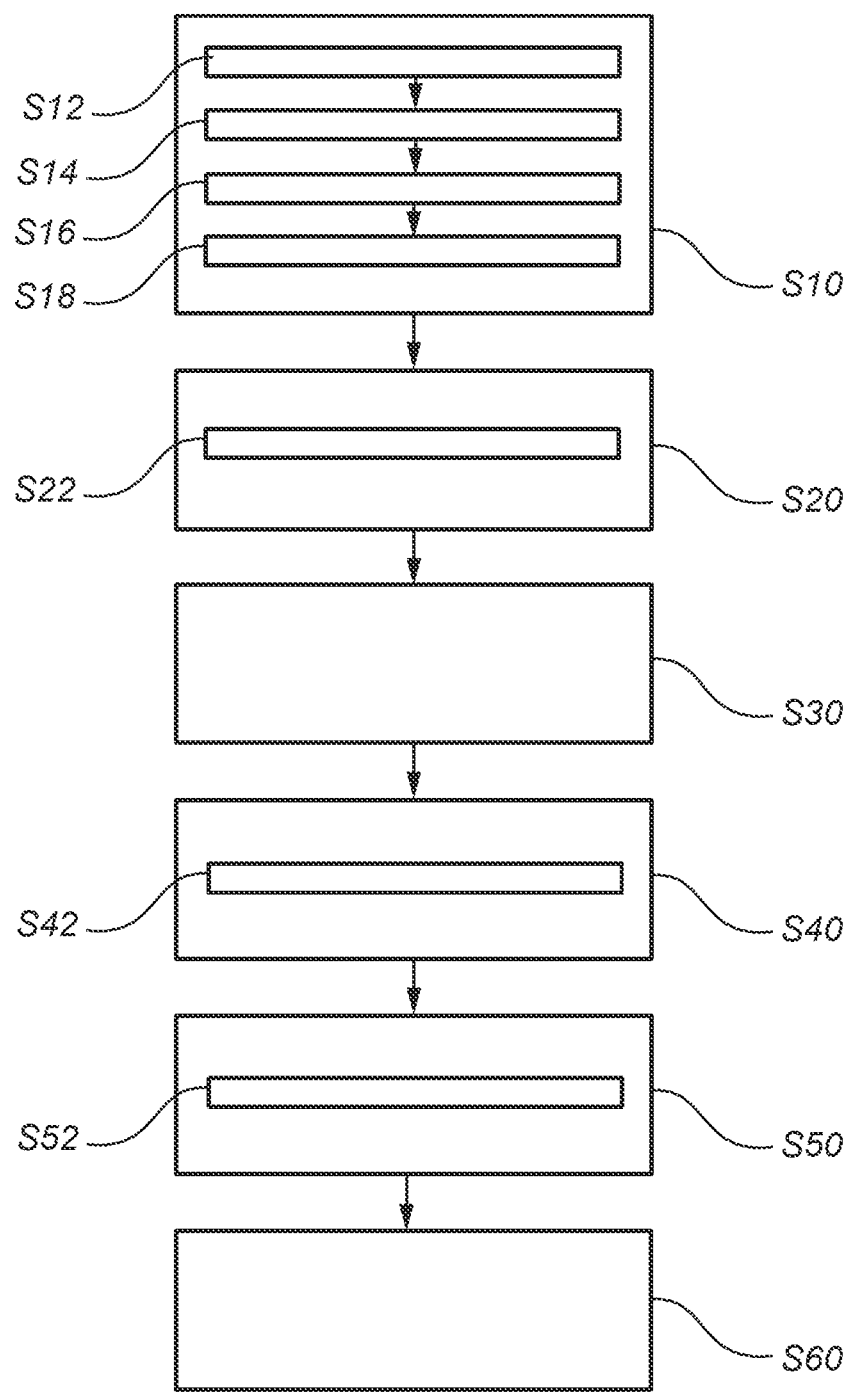
FIG. 2 is a flowchart illustrating the steps of a method in accordance with example embodiments of the invention.
Figure 3:
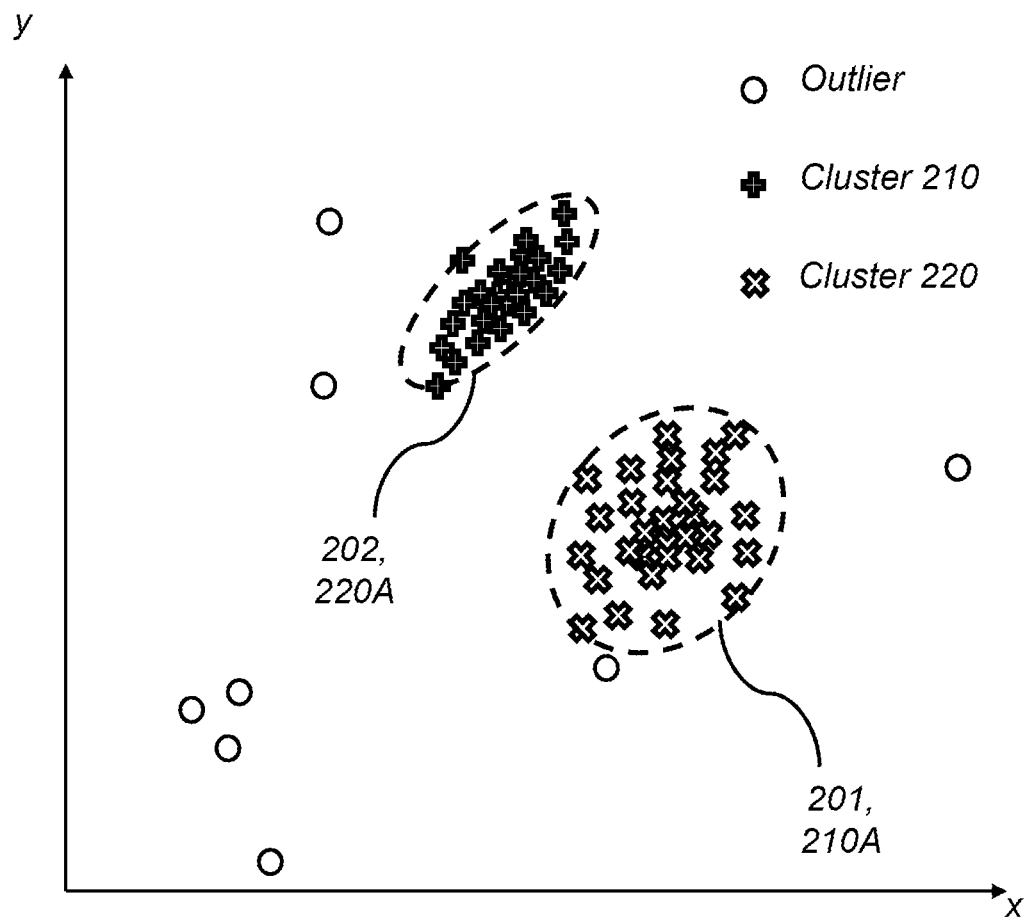
FIG. 3 is a graph showing second vehicle data in relation to clusters of clustered reference data.

The vehicle 1 of FIG. 1 may be subject to the method described with reference to FIG. 2. For example the controlling apparatus 3 may comprise a processing apparatus, or be referred to as a processing apparatus 3, configured to perform the method described with reference to FIG. 2. For example, the processing apparatus may be configured to identify vehicle performance by being configured to:

maintain a database with clustered reference data based on first vehicle data, in which each cluster in the clustered reference data is associated with a cluster significant parameter being a cluster threshold indicative of the association of the corresponding cluster, corresponding to step S10 of FIG. 2, collect second vehicle data, corresponding to step S20 of FIG. 2, determine an associated significant parameter of the second vehicle data corresponding to the cluster significant parameter corresponding to step S30 of FIG. 2, compare the second vehicle data and associated significant parameter with the clustered reference data and cluster thresholds, corresponding to step S40 of FIG. 2, identify the second vehicle data with regards to the clusters of the clustered reference data by means of the associated significant parameter and the cluster threshold, and in response of not being able to identify the second vehicle data with regards to a cluster of the clustered reference data, define the second vehicle data as an outlier, corresponding to step S50 of FIG. 2, identifying vehicle performance based on the cluster identification and determined outlier of the second vehicle data, corresponding to step S60 of FIG. 2.

The order of the steps in the method of FIG. 2 described in the foregoing embodiments is merely an example, and is not necessarily limited to the order described. The order of steps may be switched, unless the steps are dependent on each other, and parts of some steps may be omitted, e.g. the described sub-steps. In case one or more of sub-steps are omitted, renaming of the sub-steps is preferably carried out.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

It should be understood that the controlling apparatus 3 or processing apparatus 3 may not need to be one single unit, but its functionality may be divided into different, separate, control units, and some functionality may naturally be performed as calculations in a remote server or by cloud computing. Those skilled in the art will also appreciate that the controlling apparatus 3 or processing apparatus 3 may refer to a combination of analog and digital circuits, and/or one or more processors configured with program software and/or firmware, e.g. stored in a memory, that when executed by the one or more processors perform the one or more of the steps described in conjunction with FIG. 2. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

The invention claimed is:

1. A method for identifying vehicle performance, the method comprising:

maintaining a database with clustered reference data based on first vehicle data from one or more first vehicles, in which each cluster in the clustered reference data is associated with a cluster significant parameter being a cluster threshold indicative of the association of the corresponding cluster, collecting second vehicle data from one or more second vehicles different to the one or more first vehicles, determining an associated significant parameter of the second vehicle data corresponding to the cluster significant parameter, comparing the second vehicle data and associated significant parameter with the clustered reference data and cluster thresholds, identifying the second vehicle data with regards to the clusters of the clustered reference data by means of the associated significant parameter and the cluster threshold, and in response of not being able to identify the second vehicle data with regards to a cluster of the clustered reference data, define the second vehicle data as an outlier, wherein the second vehicle data belongs to more than one cluster, identifying vehicle performance based on the combination of cluster identification and determined outlier of the second vehicle data.

2. The method according to claim 1, wherein comparing the second vehicle data and associated significant parameter with the clustered reference data and cluster thresholds comprises: comparing the associated significant parameter with each cluster threshold of the clustered reference data to provide compared vehicle data, and wherein identifying the second vehicle data with regards to the clusters of the clustered reference data comprises: determining whether or not the compared vehicle data achieves a pre-set criteria, and determining that the second vehicle data belongs to an identified cluster in response of determining that the compared vehicle data achieves the pre-set criteria, and determining that the second vehicle data is an outlier in response of determining that the compared vehicle data does not achieve the pre-set criteria.

3. The method according to claim 1, wherein the collecting second vehicle data comprises pre-processing the second vehicle data by aggregating the second vehicle data over a time period to provide aggregated second vehicle data, wherein the associated significant parameter is determined based on the aggregated second vehicle data.

4. The method according to claim 1, wherein the cluster significant parameter and the associated significant parameter for the second vehicle data are based on the Mahalanobis distance.

5. The method according to claim 1, wherein any outlier identified does not belong to an identified cluster.

6. The method according to claim 1, wherein the clustered reference data based on first vehicle data is determined by:
collecting first vehicle data and pre-processing the first vehicle data by aggregating the first vehicle data over a time period to provide aggregated first vehicle data;
processing the aggregated first vehicle data by clustering the aggregated first vehicle data using a clustering technique to provide clustered reference data based on first vehicle data.

7. The method according to claim 6, further comprising:
identifying cluster within the clustered reference data by comparing the clustered reference data with known characteristics to provide a set of identified clusters within the clustered reference data;
generating a predictive model for the identified clusters and for each identified cluster determine a cluster significant parameter being a cluster threshold indicative of the association of the corresponding cluster.

8. The method according to claim 7, wherein the predictive model for the identified clusters is based on the fitting of a multivariate Gaussian probability distribution to each identified cluster.

9. The method according to claim 6, wherein the clustering technique is a machine learning algorithm.

10. The method according to claim 1, wherein the second vehicle data comprises vehicle behaviour data that is indicative of at least one of vehicle behaviour or vehicle usage.

11. The method according to claim 1, wherein the second vehicle data comprises non-sensor based data.

12. The method according to claim 1, wherein the step of identifying vehicle performance is based on the combination of cluster identification and determined outlier of the second vehicle data.

13. The method according to claim 1, wherein the second vehicle data belongs to more than one cluster.

14. The method according to claim 1, wherein the vehicle performance is one of vehicle usage patterns, wear patterns, premature failure indicators and quality problems.

15. The method according to claim 1, further comprising classifying the vehicle performance in response to identifying vehicle performance based on the determined cluster identification and determined outlier of the second vehicle data, such that a vehicle performance related to malicious operation of the second vehicle is classified and/or categorized into an irrational usage pattern.

16. The method according to claim 1, further comprising classifying the vehicle performance in response to identifying vehicle performance based on the determined cluster identification and determined outlier of the second vehicle data, wherein the vehicle performance is classified and/or categorized based on different routes taken by the vehicle, and possibly the effects such different routes have on vehicle components.

17. A non-transitory computer readable medium carrying a computer program comprising program code that, when the program code is run on a computer, cause the computer to:
maintain a database with clustered reference data based on first vehicle data from one or more first vehicles, in which each cluster in the clustered reference data is associated with a cluster significant parameter being a cluster threshold indicative of the association of the corresponding cluster;
collect second vehicle data from one or more second vehicles different to the one or more first vehicles,
determine an associated significant parameter of the second vehicle data corresponding to the cluster significant parameter,
compare the second vehicle data and associated significant parameter with the clustered reference data and cluster thresholds,
identify the second vehicle data with regards to the clusters of the clustered reference data by means of the associated significant parameter and the cluster threshold, and in response of not being able to identify the second vehicle data with regards to a cluster of the clustered reference data, define the second vehicle data as an outlier, wherein the second vehicle data belongs to more than one cluster,
identify vehicle performance based on the combination of cluster identification and determined outlier of the second vehicle data.

18. A processing apparatus for identifying vehicle performance, the processing apparatus being configured to:
maintain a database with clustered reference data based on first vehicle data from one or more first vehicles, in which each cluster in the clustered reference data is associated with a cluster significant parameter being a cluster threshold indicative of the association of the corresponding cluster;
collect second vehicle data from one or more second vehicles different to the one or more first vehicles,
determine an associated significant parameter of the second vehicle data corresponding to the cluster significant parameter,
compare the second vehicle data and associated significant parameter with the clustered reference data and cluster thresholds,
identify the second vehicle data with regards to the clusters of the clustered reference data by means of the associated significant parameter and the cluster threshold, and in response of not being able to identify the second vehicle data with regards to a cluster of the clustered reference data, define the second vehicle data as an outlier, wherein the second vehicle data belongs to more than one cluster, identify vehicle performance based on the combination of cluster identification and determined outlier of the second vehicle data.

19. A vehicle comprising a processing apparatus according to claim 18.

* * * * *